(12) United States Patent
Matsuno et al.

(10) Patent No.: US 9,873,376 B2
(45) Date of Patent: Jan. 23, 2018

(54) DRIVING ASSIST CONTROLLER FOR VEHICLE

(71) Applicant: Fuji Jukogyo Kabushiki Kaisha, Tokyo (JP)

(72) Inventors: Koji Matsuno, Tokyo (JP); Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 23 days.

(21) Appl. No.: 14/306,029

(22) Filed: Jun. 16, 2014

(65) Prior Publication Data

US 2015/0002284 A1    Jan. 1, 2015

(30) Foreign Application Priority Data

Jul. 1, 2013   (JP) ................................. 2013-138084

(51) Int. Cl.
| | |
|---|---|
| *B60Q 9/00* | (2006.01) |
| *B60T 8/1755* | (2006.01) |
| *B60T 8/1761* | (2006.01) |
| *B60T 7/22* | (2006.01) |

(52) U.S. Cl.
CPC ................. *B60Q 9/00* (2013.01); *B60T 7/22* (2013.01); *B60T 8/1755* (2013.01); *B60T 8/17616* (2013.01); *B60T 2201/02* (2013.01); *B60T 2201/03* (2013.01)

(58) Field of Classification Search
CPC ......... B60T 7/12; B60T 2201/08; G08G 1/16; G01S 17/93; B60K 31/0008; B60G 2400/824; B60G 2400/82; B60Q 9/008; G06T 2207/30261
See application file for complete search history.

(56) References Cited

U.S. PATENT DOCUMENTS

| | | | | |
|---|---|---|---|---|
| 6,128,088 | A | * | 10/2000 | Nishiwaki ............ G01N 21/538 356/3 |
| 6,362,773 | B1 | * | 3/2002 | Pochmuller ............. G01S 17/95 342/118 |
| 2009/0018740 | A1 | * | 1/2009 | Noda ........................ B60T 7/22 701/70 |

(Continued)

FOREIGN PATENT DOCUMENTS

JP         2003-16597 A      1/2003

*Primary Examiner* — Hongmin Fan
(74) *Attorney, Agent, or Firm* — McGinn I.P. Law Group, PLLC.

(57) ABSTRACT

A control unit of an assist controller for a vehicle estimates the visibility of a driver, calculates a visibility degradation ratio as a temporal change amount of the visibility, compares the visibility degradation ratio with a warning threshold that has been set in advance according to a vehicle speed, determines whether to warn the driver with a warning device, compares the visibility degradation ratio with a control characteristic change threshold that has been set in advance according to a vehicle speed, determines changes in control characteristics of the ABS function, skid preventing control function, and brake assist control function, compares the visibility degradation ratio with a deceleration control actuation threshold that has been set in advance according to a vehicle speed, and determines whether to execute automatic braking.

14 Claims, 5 Drawing Sheets

(56) References Cited

U.S. PATENT DOCUMENTS

| | | | | |
|---|---|---|---|---|
| 2009/0303078 | A1* | 12/2009 | Mochizuki | G08G 1/166 |
| | | | | 340/901 |
| 2011/0264349 | A1* | 10/2011 | Okubo | B60T 8/17616 |
| | | | | 701/71 |
| 2013/0141520 | A1* | 6/2013 | Zhang | G06K 9/4638 |
| | | | | 348/36 |
| 2013/0176425 | A1* | 7/2013 | Lerner | H04N 21/8153 |
| | | | | 348/135 |
| 2014/0032094 | A1* | 1/2014 | Heinrichs-Bartscher | B60T 7/22 |
| | | | | 701/301 |
| 2015/0310313 | A1* | 10/2015 | Murayama | G01C 21/3602 |
| | | | | 382/104 |

\* cited by examiner

Mist

DRIVING ASSIST CONTROLLER FOR VEHICLE

CROSS-REFERENCE TO RELATED APPLICATIONS

The present application claims priority from Japanese Patent Application No. 2013-138084 filed on Jul. 1, 2013, the entire contents of which are hereby incorporated by reference.

BACKGROUND

1. Technical Field

The present invention relates to a driving assist controller for a vehicle, such that various on-board control devices of the vehicle are adequately actuated according to the environment ahead of the vehicle.

2. Related Art

Various driving assist controllers for a vehicle have recently been developed and put to practical use. With such devices the shape of the road ahead of the vehicle and three-dimensional objects, such as vehicles and obstacles, present ahead of the vehicle are detected using a camera or radar to ensure safe traveling on the road and prevent collisions with the objects. For example, Japanese Unexamined Patent Application Publication (JP-A) No. 2003-16597 discloses an obstacle information presenting device which is a warning device that detects the shape information on a road, detects obstacle information on an obstacle present on the road by road-vehicle communication, calculates a visibility distance that can be viewed by a driver on the basis of the shape information on the road, and where an obstacle is detected on the road, issues a warning at a timing corresponding to a deceleration distance required to stop the vehicle before the obstacle at a predetermined deceleration. In such a warning device, when the visibility distance is equal to or less than a deceleration distance, a warning generation timing is set earlier than a timing corresponding to the deceleration distance.

With the warning device such as disclosed in JP-A No. 2003-16597, since the warning issuance timing is changed by taking into account the driver's visibility, the warning is performed in a manner closer to driver's senses than in the conventional warning devices that issue a warning in a simple manner at a fixed deceleration distance. However, since the driver's visibility changes from moment to moment under the effect of, for example, mist or blizzard, when the warning generation timing is changed without taking such changes into account, the warning generation timing is affected by changes in visibility and becomes unstable, and erroneous operations or unnecessary ON/OFF operations may be repeated. Further, in recent years various control devices such as an antilock brake system (ABS), skid preventing control device, and brake assist control device have been installed on the vehicles with the object of improving stability and safety thereof. In such control devices, implementing the control with consideration for driver's visibility also ensures more natural and accurate control, and when the onboard control devices are actuated without consideration for changes in visibility, the operation thereof is also affected by changes in visibility and becomes unstable, and it is possible that erroneous operations or unnecessary ON/OFF operations are be repeated. Meanwhile, in a case where sudden mist or blizzard occurs, the visibility is degraded, and when the driver fails to recognize, determine, and respond to the degradation of visibility, the most dangerous consequence of such poor visibility ensues. Hence, warning and control that take into account the degradation and restoration of visibility are required.

SUMMARY OF THE INVENTION

With the foregoing in view, it is an object of the present invention to provide a driving assist controller for a vehicle in which various on-board control devices are operated with consideration for driver's visibility, thereby enabling the actuation thereof at an adequate timing and in a natural manner, and the control corresponding to the state of visibility can be performed in advance at an adequate timing even when the visibility has degraded.

An aspect of the present invention provides a driving assist controller for a vehicle including: a visibility estimation unit that estimates visibility of a driver; a visibility change amount calculation unit that calculates a temporal change amount of the visibility; and a control unit that actuates a control unit on the basis of the temporal variation amount of the visibility.

DETAILED DESCRIPTION

An implementation of the present invention will be explained below with reference to the appended drawings.

Figure 1:
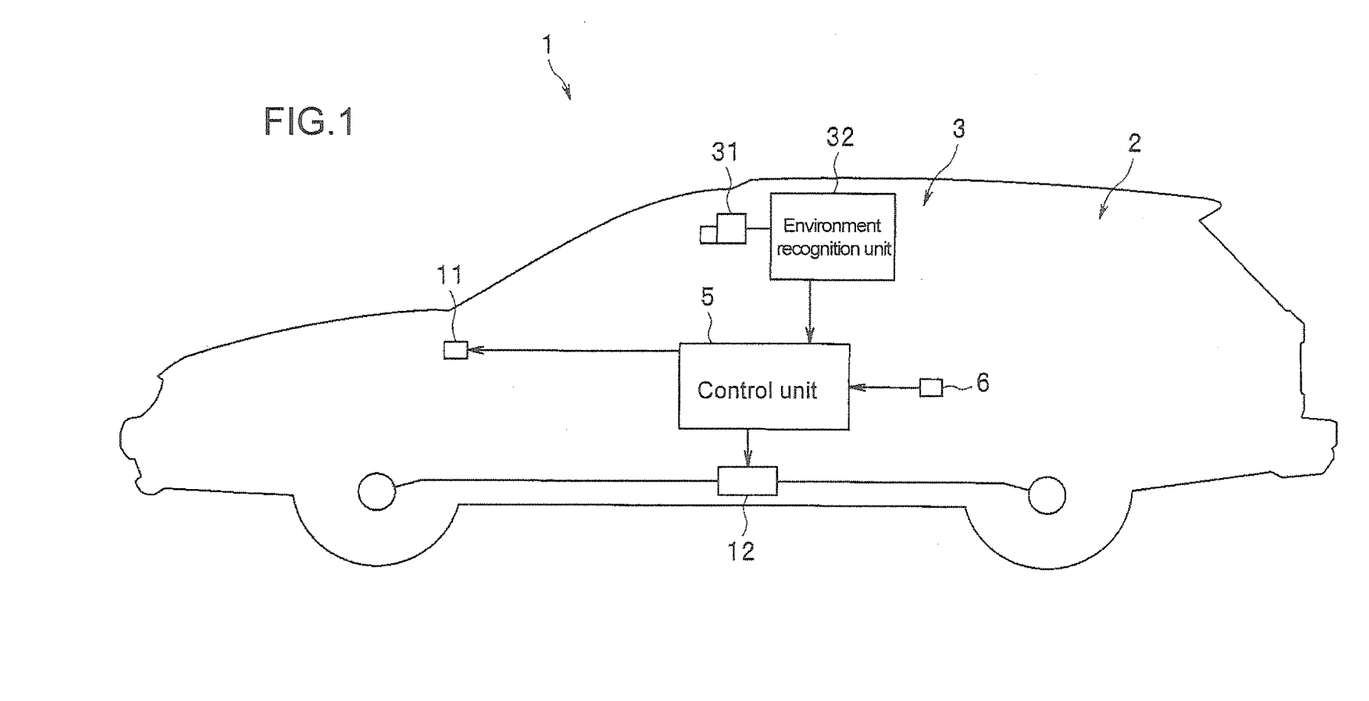
FIG. 1 is a schematic configuration diagram of the driving assist controller for a vehicle installed on a vehicle according to an implementation of the present invention.

In FIG. 1, the reference numeral 1 stands for a vehicle (host vehicle) such as an automobile. A driving assist controller 2 is installed on the host vehicle 1. The driving assist controller 2 is constituted mainly by a stereo camera unit 3 as an environment recognition unit, and a control unit 5. Various sensors such as a vehicle speed sensor 6, which detects the host vehicle speed V, are connected to the driving assist controller 2, and control signals generated by the control unit 5 are outputted, as necessary, to a warning device (warning lamp) 11 and a brake control device 12.

The stereo camera unit 3 is constituted by a stereo camera 31 and an environment recognition unit 32 that processes signals from the stereo camera 31.

The stereo camera 31 is constituted by a pair of left and right CCD cameras as a stereo optical system, each camera being provided with a solid-state imaging element, for example, such as a charge coupled device (CCD). The CCD cameras constituting the stereo camera 31 are mounted at a predetermined interval at the front of the ceiling inside the vehicle cabin. Stereo images of the objects outside the vehicle are captured from different viewpoints, and the captured image information is outputted to the environment recognition unit 32.

The environment recognition unit 32 receives input of the image information from the stereo camera 31, recognizes lane line data or the like ahead of the vehicle and estimates a host vehicle lane. The environment recognition unit 32 performs the processing of the image information from the stereo camera 31, for example, in the following manner. Thus, distance information is generated based on the triangulation principle from the displacement of corresponding positions with respect to a pair of left and right images (pair of stereo images) that is captured by the stereo camera 31 in the host vehicle advancement direction. More specifically, the environment recognition unit 32 divides a reference image (for example, a right image) into small regions, compares the brightness or color pattern of each small region with a comparative image, extracts the corresponding regions, and determines the distance distribution over the entire reference image. Then, the environment recognition unit 32 examines the difference in brightness between each pixel on the reference image and the adjacent pixels, extracts the pixel for which the difference in brightness on both sides exceeds a threshold (contrast threshold) as an edge, and assigns the distance information to the extracted pixel (edge), thereby generating an edge distribution image (distance image) provided with the distance information. The environment recognition unit 32 then performs, for example, well-known grouping processing with respect to the distance image and performs pattern matching with preset templates, thereby recognizing a lane line ahead of the host vehicle. This recognition of the lane line is continuously monitored between the frames. When the environment recognition unit 32 thus recognizes the lane line, the width W of the lane line and the widthwise position of the host vehicle 1 in the host vehicle lane (distance from the host vehicle 1 to the left lane line and to the right lane line) are determined from the position coordinates of the left and right lane lines and also stored as lane line data. Further, the environment recognition unit 32 also performs extrapolation by further extending the lane line obtained with the image information from the stereo camera 31 to obtain estimated coordinate data with respect to a lane line other than the above-described lane line obtained from the brightness and contrast of the image information from the stereo camera 31, for example, a lane line portion interrupted due to certain circumstances, or the lane line of the host vehicle lane that is estimated to be present far away. The coordinate data on the extrapolated lane line may be determined by map data of a navigation system (not illustrated in the figure). The lane line information on the travel lane which is thus obtained with the stereo camera unit 3 is outputted to the control unit 5.

Where the warning device (warning lamp) 11 receives input of a control signal of warning generation from the below-described control unit 5, a predetermined lamp on an onboard display is lighted up (caused to blink), thereby notifying the driver of degraded visibility.

The brake control device 12 is connected to a brake drive unit (not illustrated in the figure) that can be independently actuated for four wheels, and is configured to be provided with the conventional ABS function, skid preventing control function, brake assist control function, and auto brake control function. Where a signal to change a control characteristic is inputted from the control unit 5, the control characteristic of the ABS function, skid preventing control function, and brake assist control function is changed, and where a signal of automatic brake target fluid pressure calculated by the control unit 5 is inputted from the control unit 5, the control of adding automatic braking is executed.

The ABS function, skid preventing control function, and brake assist control function are explained hereinbelow in a simple manner.

The ABS function is a function of preventing the slip occurring when a wheel is locked during abrupt braking. With this function, the wheel speed, wheel acceleration, and estimated vehicle speed are detected, and brake fluid pressure is adjusted to obtain the suitable slip ratio (allowed slip ratio: for example, close to 15%). Thus, the brake force of a wheel during braking usually has a property of rapidly increasing with the increase in slip ratio, reaching a maximum at a certain point, and then gradually decreasing. Meanwhile, the cornering force of the wheel increases with the decrease in slip ratio. Therefore, the allowed slip ratio is determined with consideration for the balance of the brake force and cornering force, but where the attention is simply focused only on the braking distance, the operation at a larger allowed slip ratio can result in a reduced braking distance.

With the skid preventing control function, for example, the difference between a target yaw rate calculated from a steering wheel angle and vehicle speed on the basis of a vehicle model and a yaw rate (measured value obtained with a sensor), which is actually generated in the vehicle, is determined. Where this yaw rate difference exceeds a preset threshold (actuation timing threshold), the absolute value of the actual yaw rate is greater than the absolute value of the target yaw rate and the vehicle can be determined to have a tendency to oversteer. In this case, a brake force (additional brake force) corresponding to the size of the yaw rate difference is applied to the turning outer wheel, a yaw moment is generated in the vehicle, and vehicle stability is increased (tendency to oversteer is corrected). Meanwhile, where the absolute value of the actual yaw rate is less than the absolute value of the target yaw rate and the vehicle can be determined to have a tendency to understeer, a brake force (additional brake force) corresponding to the size of the yaw rate difference is applied to the turning inner wheel, a yaw moment is generated in the vehicle, and vehicle turning ability is increased (tendency to understeer is corrected).

The brake assist control function is a control function of further enhancing the depression force acting upon the brake pedal and increasing the brake force when a strong braking force is necessary, for example, during emergency braking. For example, where the brake pedal depression rate (or the brake fluid pressure sensor increase rate) exceeds a preset threshold (actuation threshold), it is determined that emergency braking is performed and a braking force is increased to ensure braking assist.

Figure 2:
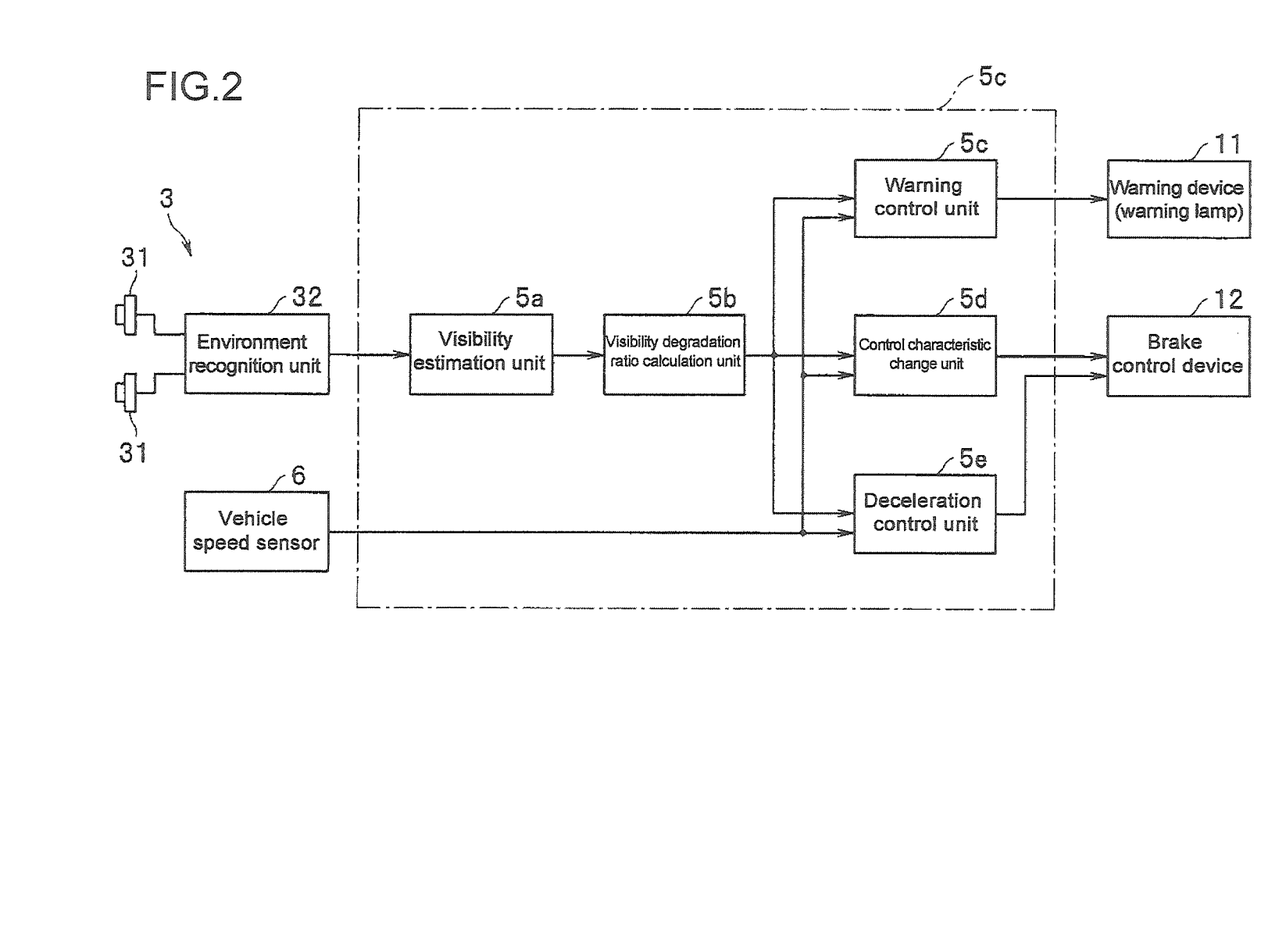
FIG. 2 is a functional block diagram of the control unit according to the implementation of the present invention.
Figure 3:
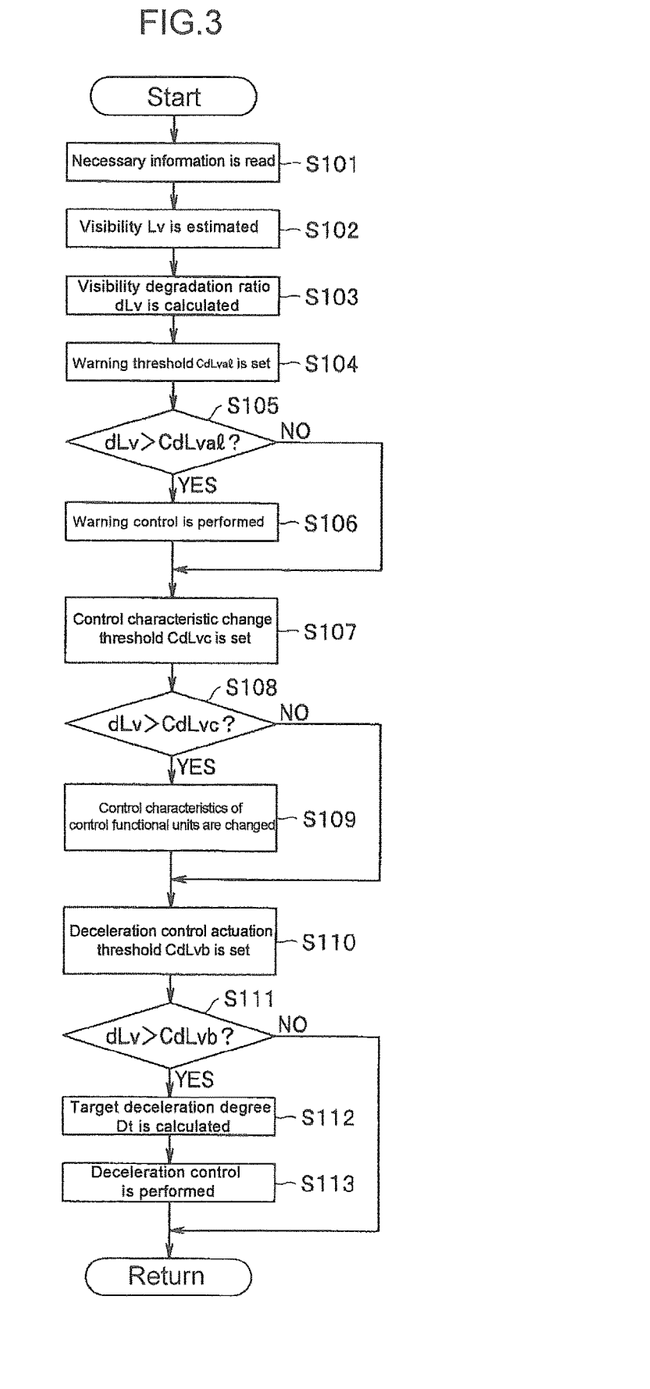
FIG. 3 is a flowchart of the vehicle driving assist control program according to the implementation of the present invention.

The control unit 5 of the driving assist controller 2 receives input of the lane line information on the travel lane from the above-mentioned environment recognition unit 32, receives input of the vehicle speed V from the vehicle speed sensor 6, and then estimates the driver's visibility Lv, calculates the visibility degradation ratio dLv, which is a change amount indicating, in particular, how the visibility Lv degrades in each period of time, as the temporal change amount of the visibility Lv, compares the visibility degradation ratio dLv with a warning threshold CdLval as the first threshold that has been set in advance according to the vehicle speed V, determines whether to generate a warning to the driver from the warning device (warning lamp) 11, compares the visibility degradation ratio dLv with the control characteristic change thresholds CdLvc as the second, third, and fourth thresholds (in the present implementation, second threshold=third threshold=fourth threshold) that have been set in advance according to the vehicle speed V, determines whether to change the control characteristics of the ABS function, skid preventing control function, and brake assist control function, compares the visibility degradation ratio dLv with the deceleration control actuation threshold CdLvb as the fifth threshold that has been set in advance according to the vehicle speed V, and determines whether to perform automatic braking, the above-mentioned operations being performed according to the below-described vehicle driving assist control program illustrated in FIG. 3. Therefore, as illustrated in FIG. 2, the control unit 5 is constituted mainly by a visibility estimation unit 5a, a visibility degradation ratio calculation unit 5b, a warning control unit 5c, a control characteristic change unit 5d, and a deceleration control unit 5e.

Figure 4:
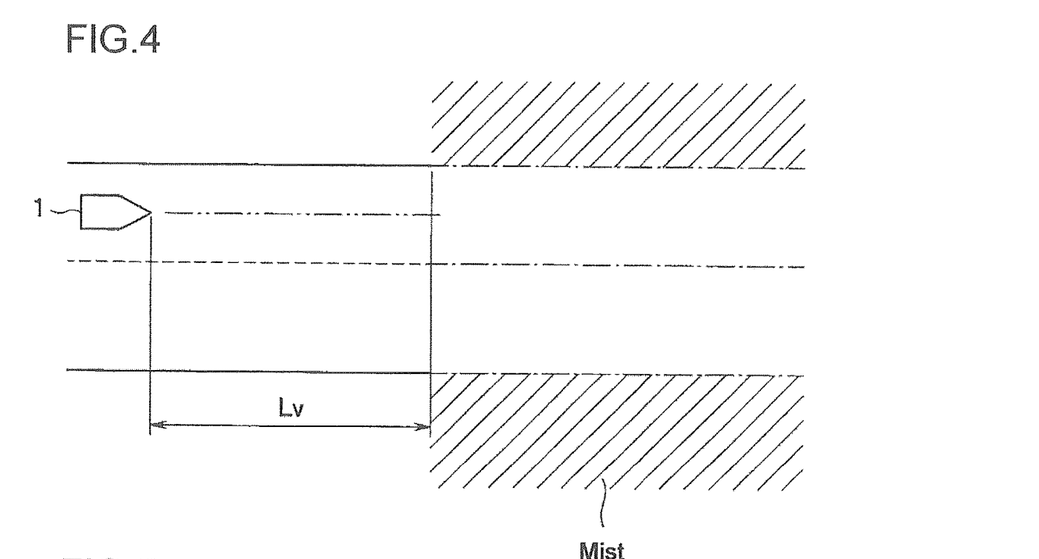
FIG. 4 is an explanatory drawing illustrating the host vehicle and visibility according to the implementation of the present invention.

The visibility estimation unit 5a receives input of the lane line information on the travel lane from the environment recognition unit 32. An average contrast value of human vision that recognizes a lane line on the road is set in advance as a threshold by tests or the like on the basis, for example, of lane line information (forward distance information on the travel lane inputted from the environment recognition unit 32, and the zone to the farthest distance along the lane line detected at a contrast value higher than the threshold is estimated as the driver's visibility Lv (see FIG. 4) and outputted to the visibility degradation ratio calculation unit 5b. Thus, the visibility estimation unit 5a is provided as a visibility estimation unit.

The visibility degradation ratio calculation unit 5b receives input of the visibility Lv from the visibility estimation unit 5a. Then, for example, the visibility degradation ratio dLv, which is the temporal change amount of the visibility Lv, in particular, the change amount indicating how the visibility Lv degrades in each period of time, is calculated, for example, by the following Eq. (1).

$$dLv = (Lvp - Lvc)/T \quad (1)$$

where Lvp is the visibility T (sec) before which is calculated by the following Eq. (2), and Lvc is the present visibility which is calculated by the following Eq. (3).

$$Lvp = (\Sigma Lv(-T - j \cdot \Delta t))/(k+1), \text{ where } \Sigma \text{ is from } j=0 \text{ to } j=k \quad (2)$$

$$Lvc = (\Sigma Lv(-j \cdot \Delta t))/(k+1), \text{ where } \Sigma \text{ is from } j=0 \text{ to } j=k \quad (3)$$

Lv in Eq. (2) and Eq. (3) is an instantaneous value at a timing represented by the respective symbol, $\Delta t$ is a sampling time.

Figure 5:
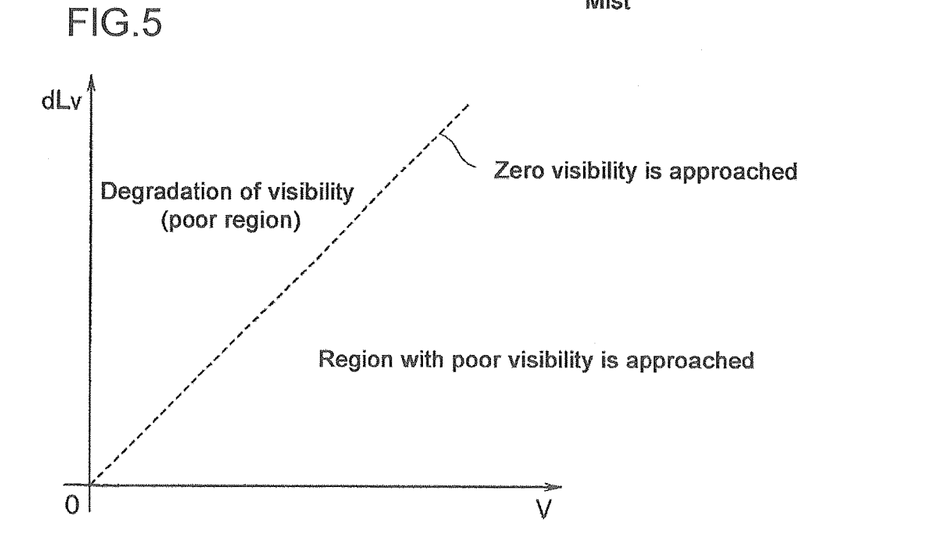
FIG. 5 is an explanatory drawing illustrating the vehicle speed and visibility degradation rate according to the implementation of the present invention.

As illustrated by the above-mentioned Eq. (1), in order to determine the visibility degradation ratio dLv, where the visibility degradation ratio dLv has a (+) sign, it is understood that the visibility Lv has degraded as when the road is enveloped in a mist. Conversely, where the visibility degradation ratio dLv has a (−) sign, it is understood that the visibility Lv is good, that is, the mist has cleared. For example, FIG. 5 illustrates the concept of the vehicle traveling at various speeds toward a location that is enveloped in a mist. Where the vehicle speed is 0, the visibility degradation ratio dLv is also 0, but as the vehicle speed increases, the visibility degradation ratio dLv also rises. The visibility degradation ratio dLv calculated by the above-mentioned Eq. (1) is outputted to the warning control unit 5c, the control characteristic change unit 5d, and the deceleration control unit 5e. The visibility degradation ratio calculation unit 5b is provided as a visibility degradation ratio calculation unit.

Figure 6:
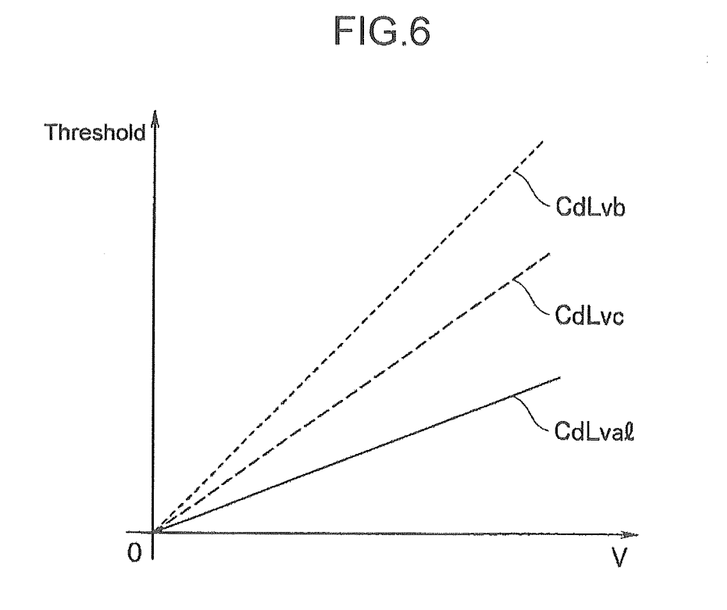
FIG. 6 illustrates an example of thresholds that are set according to the vehicle speed in the implementation of the present invention.

The warning control unit 5c receives input of the vehicle speed V from the vehicle speed sensor 6 and receives input of the visibility degradation ratio dLv from the visibility degradation ratio calculation unit 5b. A threshold (warning threshold CdLval serving as the first threshold) corresponding to the vehicle speed V is then set, for example, on the basis of the map which is illustrated in FIG. 6 and has been set in advance by tests or computations. The visibility degradation ratio dLv is then compared with the warning threshold CdLval, and when the visibility degradation ratio dLv exceeds the warning threshold CdLval, a signal is outputted to the warning device (warning lamp) 11. As a result, for example, a predetermined lamp is lighted up (caused to blink), notifying the driver of the degraded visibility. The warning control unit Sc and the warning device (warning lamp) 11 are thus provided as a warning control unit.

The control characteristic change unit 5d receives input of the vehicle speed V from the vehicle speed sensor 6 and receives input of the visibility degradation ratio dLv from the visibility degradation ratio calculation unit 5b. A threshold (control characteristic change threshold CdLvc serving as the second, third, and fourth thresholds (in the present implementation, second threshold=third threshold=fourth threshold)) corresponding to the vehicle speed V is then set, for example, on the basis of the map which is illustrated in FIG. 6 and has been set in advance by tests or computations. The visibility degradation ratio dLv is then compared with the control characteristic change threshold CdLvc, and when the visibility degradation ratio dLv exceeds the control characteristic change threshold CdLvc, a signal is outputted to the brake control device 12 and the control characteristics of the above-mentioned ABS function, skid preventing control function, and brake assist control function are changed. More specifically, the brake control device 12 changes the allowed slip ratio in the ABS function to a large value and changes a control characteristic to shorten the braking distance during emergency braking. The brake control device 12 also decreases the actuation timing threshold in the skid preventing control function, changes the control characteristic in the direction of facilitating the actuation of the skid preventing control, changes also the additional braking force such that a large braking force is applied, and changes the control characteristic to ensure adequately the shortening of the braking distance and the vehicle stability. Where the skid preventing control function has been switched OFF with a device that can selectively ON/OFF switch this function, the function is set ON, and where the involvement degree of the skid preventing control function can be selectively changed to a lower level, it is returned to the reference setting. The brake control device 12 then changes the control characteristics such as to decrease the actuation threshold in the brake assist control function and increase the braking force at an appropriate early timing, thereby enabling the assist. The control characteristic change unit 5d and brake control device 12 are thus provided to have the functions of the antilock brake control unit, skid preventing control unit, and brake assist control unit.

The deceleration control unit 5e receives input of the vehicle speed V from the vehicle speed sensor 6 and receives input of the visibility degradation ratio dLv from the visibility degradation ratio calculation unit 5b. A threshold (deceleration control actuation threshold CdLvb as the fifth threshold) corresponding to the vehicle speed V is then set, for example, on the basis of the map which is illustrated in FIG. 6 and has been set in advance by tests or computations. The visibility degradation ratio dLv is then compared with the deceleration control actuation threshold CdLvb, and when the visibility degradation ratio dLv exceeds the deceleration control actuation threshold CdLvb, for example, the target deceleration degree Dt is calculated by the following Eq. (4), the automatic braking target fluid pressure Pt is calculated by Eq. (5), the automatic braking target fluid pressure Pt is outputted to the brake control device 12, and automatic braking is performed. The deceleration control unit 5e and the brake control device 12 are thus provided to have the function of the deceleration control unit.

$$Dt=\int(V-CdLvb)dt \quad (4)$$

Where 0<Dt<(preset maximum value)

$$Pt=Cb \cdot Dt \quad (5)$$

Here, Cd is a constant determined by brake specifications.

The vehicle driving assist control performed by the control unit 5 configured in the above-described manner will be explained hereinbelow with reference to the flowchart illustrated in FIG. 3.

First, in S101, necessary information, that is, lane line information on the travel lane and host vehicle speed V, is read.

Then, the processing advances to S102, and an average contrast value of human vision that recognizes a lane line on the road is set in advance as a threshold, as described hereinabove, by tests or the like on the basis, for example, of lane line information (forward distance information on the lane line) on the travel lane inputted from the environment recognition unit 32, and the zone to the farthest distance along the lane line detected at a contrast value higher than the threshold is estimated as the driver's visibility Lv in the visibility estimation unit 5a.

The processing then advances to S103, and the visibility degradation ratio dLv is calculated by the visibility degradation ratio calculation unit 5b, for example, by Eq. (1) above.

The processing then advances to S104, and the warning threshold CdLval corresponding to the vehicle speed V is then set by the warning control unit 5c, for example, on the basis of the map which is illustrated in FIG. 6.

The processing then advances to S105, the visibility degradation ratio dLv is compared with the warning threshold CdLval in the warning control unit 5c, and when the visibility degradation ratio dLv exceeds the warning threshold CdLval (dLv>CdLval), the processing advances to S106, a signal is outputted to the warning device (warning lamp) 11, for example, a predetermined lamp is lighted up (caused to blink), thereby notifying the driver of visibility degradation, and the processing advances to S107. When the determination result in S105 is dLv≤CdLval, the processing directly advances to S107.

Where the processing advances to S107, the control characteristic change threshold CdLvc corresponding to the vehicle speed V is set by the control characteristic change unit 5d, for example, on the basis of the map illustrated in FIG. 6.

The processing then advances to S108, and the visibility degradation ratio dLv is compared by the control characteristic change unit 5d with the control characteristic change threshold CdLvc. Where the visibility degradation ratio dLv exceeds the control characteristic change threshold CdLvc (when dLv>CdLvc), the processing advances to S109, a signal is outputted to the brake control device 12, the control characteristics of the above-mentioned ABS function, skid preventing control function, and brake assist control function are changed, and the processing advances to S110. More specifically, in this change of control characteristics, the brake control device 12 changes the allowed slip ratio in the ABS function to a large value and changes a control characteristic to shorten the braking distance during emergency braking. The brake control device 12 also decreases the actuation timing threshold in the skid preventing control function, changes the control characteristic in the direction of facilitating the actuation of the skid preventing control, changes the additional braking force such that a large braking force is applied, and changes the control characteristic to ensure adequately the shortening of the braking distance and the vehicle stability. Where the skid preventing control function has been switched OFF with a device that can selectively ON/OFF switch this function, the function is set ON, and where the involvement degree of the skid preventing control function can be selectively changed to a lower level, it is returned to the reference setting. The brake control device 12 then changes the control characteristics such as to decrease the actuation threshold in the brake assist control function and increase the braking force at an appropriate early timing, thereby enabling the assist.

Where the result of determination in S108 is dLv≤CdLvc, the processing directly advances to S110.

Where the processing advances to S110, the deceleration control actuation threshold CdLvb is set by the deceleration control unit 5e, for example, on the basis of the map which is illustrated in FIG. 6.

The processing then advances to S111, the visibility degradation ratio dLv is compared by the deceleration control unit 5e with the deceleration control actuation threshold CdLvb, and where the visibility degradation ratio dLv exceeds the deceleration control actuation threshold CdLvb (dLv>CdLvb), the processing advances to S112, the target deceleration degree Dt is calculated by Eq. (4) above, the processing advances to S113, the automatic braking target fluid pressure Pt is calculated by Eq. (5) above, the automatic braking target fluid pressure Pt is outputted to the brake control device 12, and automatic braking is performed.

Where the result of determination in S111 is dLv≤CdLvb, the program is terminated.

Thus, in accordance with the implementation of the present invention, the driver's visibility Lv is estimated, the visibility degradation ratio dLv, which is a change amount indicating, in particular, how the visibility Lv degrades in each period of time, is calculated as the temporal change amount of the visibility Lv, the visibility degradation ratio dLv is compared with the warning threshold CdLval that has been set in advance according to the vehicle speed V, it is determined whether to generate a warning to the driver from the warning device 11, the visibility degradation ratio dLv is compared with the control characteristic change threshold CdLvc that has been set in advance according to the vehicle speed V, it is determined whether to change the control characteristics of the ABS function, skid preventing control function, and brake assist control function, the visibility degradation ratio dLv is compared with the deceleration control actuation threshold CdLvb that has been set in advance according to the vehicle speed V, and it is determined whether to perform automatic braking. Therefore, various on-board control devices are operated with consideration for driver's visibility, thereby enabling the actuation thereof at an adequate timing and in a natural manner, and the control corresponding to the change in visibility can be performed in advance at an adequate timing even when the visibility has degraded.

In the implementation, the second, third, and fourth thresholds are set to satisfy the condition of the second threshold=third threshold=fourth threshold by taking one control characteristic change threshold CdLvc as a representative threshold, but the thresholds may be also set to different values. The change of control characteristic is also explained by way of example in which the control characteristics of three functions, namely, ABS function, skid preventing control function, and brake assist control function, are changed, but those three functions are not limiting and control characteristics of other functions, for example, of four-wheel drive control, may be also changed. It is also possible to change the characteristics of any one control function or any two control functions. Further, in the implementation of the present invention the lane line is detected and the visibility is set on the basis of image information from the stereo camera unit 3, but those operations may be also performed on the basis of image information of a monocular camera unit and a color camera unit.

The invention claimed is:

1. A driving assist controller for a vehicle, comprising:
a visibility estimation unit that estimates a visibility of a driver based on a farthest distance along a lane line detected at a contrast value higher than an average contrast value of human vision which is set in advance based on testing data and recognizes the visibility of the driver in order to understand a state of the visibility of the driver due to an influence of an environment in a direction of travel;
a visibility degradation ratio calculation unit that calculates a visibility degradation ratio based on a temporal change amount of the visibility of the driver in each period of time estimated by the visibility estimation unit; and
a first control unit that compares the visibility degradation ratio with predetermined values according to the vehicle speed and detects whether the visibility degradation ratio exceeds the predetermined values,
wherein the first control unit outputs a detection of the visibility degradation ratio to a second control unit that controls the vehicle based on the visibility of the driver.

2. The driving assist controller for a vehicle according to claim 1, further comprising
an environment recognition unit that detects lane line information on a travel lane ahead of the vehicle on the basis of image information and extrapolates future lane line information,
wherein the visibility estimation unit estimates the visibility of the driver on a basis of the lane line information and the extrapolated future lane line information.

3. The driving assist controller for a vehicle according to claim 1, wherein
the second control unit comprises at least a warning control unit, and
the warning control unit compares the temporal change amount of the visibility with a preset first threshold to determine whether to warn the driver.

4. The driving assist controller for a vehicle according to claim 1, wherein
the second control unit comprises at least an antilock brake control unit actuated by an allowed slip ratio and preventing a wheel from locking during braking; and
the antilock brake control unit compares the temporal change amount of the visibility with a preset second threshold and changes the allowed slip ratio.

5. A driving assist controller for a vehicle, comprising:
a visibility estimation unit that estimates visibility of a driver;
a visibility change amount calculation unit that calculates a temporal change amount of the visibility; and
a control unit that actuates a second control unit on a basis of the temporal change amount of the visibility,
wherein:
the second control unit comprises at least a skid preventing control unit that generates a yaw momentum in the vehicle and prevents the vehicle from skidding; and
the skid preventing control unit compares the temporal change amount of the visibility with a preset third threshold and changes at least one of a generation timing of the yaw momentum and an intensity of the generated yaw momentum.

6. The driving assist controller for a vehicle according to claim 1, wherein
the second control unit comprises at least a brake assist control unit that assists a braking force created by the driver; and
the brake assist control unit compares the temporal Change amount of the visibility with a preset fourth threshold and selectively changes an assist brake addition timing according to the comparison.

7. The driving assist controller for a vehicle according to claim 1, wherein
the second control unit comprises at least a deceleration control unit that applies a calculated target deceleration to the vehicle and decelerates the vehicle; and
the deceleration control unit compares the temporal Change amount of the visibility with a preset fifth threshold, selectively applies the calculated target deceleration to the vehicle according to the comparison, and decelerates the vehicle.

8. The driving assist controller for a vehicle according to claim 7, wherein the target deceleration is calculated on a basis of the vehicle speed and the preset fifth threshold.

9. The driving assist controller for a vehicle according to claim 3, wherein the preset first threshold is set to be changeable according to a vehicle speed.

10. The driving assist controller for a vehicle according to claim 1, wherein the temporal change amount of the visibility of the driver comprises a ratio of a previous visibility of the driver and a current visibility of the driver.

11. The driving assist controller for a vehicle according to claim 1, wherein the temporal change amount of the visibility of the driver is a ratio of a previous visibility of the driver and a current visibility of the driver such that a positive ratio indicates a degradation of the visibility of the driver and a negative ratio indicates an improvement of the visibility of the driver.

12. The driving assist controller for a vehicle according to claim 10, wherein a previous visibility of the driver occurs a predetermined time before a current visibility of the driver.

13. The driving assist controller for a vehicle according to claim 10, wherein the previous visibility of the driver occurs a predetermined time before the current visibility of the driver,
wherein the ratio is calculated based on the predetermined time.

14. The driving assist controller for a vehicle according to claim 11, wherein a previous visibility of the driver occurs a predetermined time before a current visibility of the driver.

* * * * *